United States Patent
Lowe et al.

(10) Patent No.: US 7,010,657 B2
(45) Date of Patent: Mar. 7, 2006

(54) AVOIDING DEADLOCK BETWEEN STORAGE ASSIGNMENTS BY DEVICES IN A NETWORK

(75) Inventors: Darryn Lowe, Botany (AU); Ricardo Gandia, Sutherland (AU); Geetha Varuni Witana, Langley (AU)

(73) Assignee: Motorola, Inc., Schaumburg, IL (US)

( * ) Notice: Subject to any disclaimer, the term of this patent is extended or adjusted under 35 U.S.C. 154(b) by 329 days.

(21) Appl. No.: 10/623,750

(22) Filed: Jul. 21, 2003

(65) Prior Publication Data

US 2005/0021915 A1    Jan. 27, 2005

(51) Int. Cl.
*G06F 12/00* (2006.01)
*G06F 13/00* (2006.01)
*G06F 15/16* (2006.01)
*G06F 17/00* (2006.01)

(52) U.S. Cl. ............ 711/165; 711/148; 707/8; 707/10; 709/214; 709/216; 709/218

(58) Field of Classification Search ............ None
See application file for complete search history.

(56) References Cited

U.S. PATENT DOCUMENTS

| 5,764,972 A | 6/1998 | Crouse et al. |
| 6,269,382 B1 * | 7/2001 | Cabrera et al. ............ 707/204 |
| 6,336,120 B1 | 1/2002 | Noddings et al. |
| 2002/0188605 A1 * | 12/2002 | Adya et al. .............. 707/4 |

OTHER PUBLICATIONS

"Microsoft Computer Dictionary", 2002, Microsoft Press, 5th Edition, p. 518.*

* cited by examiner

*Primary Examiner*—Christian Chace
*Assistant Examiner*—Ankur Gogia

(57) ABSTRACT

A method of avoiding deadlock during managing storage of items in a network (102) of heterogeneous storage devices (104,106,108). The method firstly detects (402) a storage event. Detection is effected by the local storage device and then the method obtains input information (404) having parameter values related to the item and the heterogeneous storage devices (104,106,108). The method then processes (406) the input information to determine a storage assignment, for storage of the item on one or more of the heterogeneous storage devices (104,106,108). The assignment is based on item-device suitability determined from a combination of at least one item selection rule and rules preventing deadlock.

10 Claims, 7 Drawing Sheets

AVOIDING DEADLOCK BETWEEN STORAGE ASSIGNMENTS BY DEVICES IN A NETWORK

FIELD OF THE INVENTION

The present invention relates to storage management systems. In particular, the present invention provides a method and system for managing storage of items across a network of heterogeneous storage devices.

BACKGROUND OF THE INVENTION

Over the past few decades, there have been significant advances in computer networking technology. Simultaneously, the field of consumer electronics (CE) has been rapidly developing, especially in the area of digitalization of electronic devices. New technologies are emerging that can make consumer electronic devices compatible with computing devices, such as a personal computer (PC). For example, the IEEE 802.11 standard can allow for wireless connectivity between various CE devices and the PCs in a network.

As a result of the above-mentioned advancements, a concept of home networking has emerged where consumers can connect the computing devices and the electronic devices in their homes. A home network is a network connecting various devices in the home environment. The home network may connect devices such as a computer, a printer, a scanner etc, as well as various consumer electronic devices such as a set top box, a Television (TV), a Personal Video Recorder (PVR), an audio jukebox, game consoles and others. The connection enables these devices to communicate and share information with each other. For example, an Internet connection, printers, or other peripherals can be shared with any device in the network, digital audio and video can be played from a PC to a stereo or television and home automation systems can be controlled through a PC. A home network can also enable sharing of storage space associated with various computing and electronic devices in the home network. This can typically allow, amongst other uses, an MP3 file to be stored either on the storage space in an MP3 jukebox, or on the storage space in a PC.

An important issue for home networks is the management of such storage space that is distributed on various devices that have disparate properties. Interconnection of these heterogeneous devices creates a complex home network that has the capacity to store various types of data and offer new ways of exchanging data. As a consequence, users are faced with a management problem in maintaining their data across a variety of storage devices distributed across the home network. This problem typically occurs when a user has for example, a collection of audio files that is too large to store entirely on a single storage device. The collection must therefore be distributed over several distinct devices, such as a PC, a jukebox and an MP3 player. The user is confronted with a problem of maintaining the collection across the distributed storage devices. This problem is compounded when storing large collections of digital items such as pictures, music and video.

The problem of managing storage space across a variety of storage devices also subsists with enterprise networks. Enterprises usually adopt a combination of storage management solutions depending on the type of their storage requirements. Some of the common storage management solutions include Redundant Array of Independent Disks (RAID), Server Attached Storage (SAS), Network-Attached Storage (NAS), Storage Area Network (SAN), and Hierarchical Storage Management (HSM) systems. These are briefly discussed below.

RAID is a method of creating one or more pools of data storage space from several hard drives. RAID combines multiple hard drives in a system, thus ensuring availability of data even if one (or more) hard drives fail. Other benefits of RAID are fast access and data transfer speed. Additionally, with RAID in place, the operating system no longer deals with individual drives, but instead with the entire disk array as one logical drive.

SAS is a storage solution in which disks or disk storage units are directly attached to a file server using, for example, one-to-one Small Computer System Interface (SCSI) attachments. In order for clients on a network to use the storage units, the client devices must have access to the server to which the storage units are connected.

NAS refers to self-contained disk storage systems that can be coupled directly to a network using an Ethernet cable in the same manner that a workstation is connected. These storage systems are self-contained since they operate independently of any server and provide one or more disks packaged in a standalone enclosure.

SAN is a dedicated network that allows a few servers to share many high-speed storage systems. SAN allows a large storage system to be logically partitioned, with each partition attached to a server. Further, SAN allows for sharing of storage equipment, such as tape drives, by multiple hosts.

HSM systems automatically manage enterprise data across a variety of storage devices, which may consist of high performance disks, RAID systems, optical storage, tape libraries and others. For example, if an aging file falls into disuse, it can be automatically moved to a slower and less expensive form of archival storage.

The above-referred storage management solutions employed by enterprise networks have one or more of the following shortcomings. These shortcomings render the enterprise storage solutions unsuitable for automatically managing distributed storage space within home networks. Firstly, enterprise storage solutions require expert management by system administrators. Users of home networks may not have the expertise or the desire to manage their collections across heterogeneous storage devices. Secondly, if a new item is added to any device in a network, the issue of automatically selecting an appropriate storage space for the new item is not addressed by any system. Most of the enterprise storage solutions are only concerned with the transfer of items between primary and secondary servers or the provision of data redundancy. Finally, most of the existing storage management solutions require centralized controllers.

SUMMARY OF THE INVENTION

The present invention provides a method and system for managing storage of items across a network of heterogeneous storage devices with a view to increasing the overall performance of the network. An intelligent allocation mechanism is embedded on each of the storage devices in the network according to an embodiment of the present invention. The intelligent allocation mechanism detects the occurrence of various storage events on the storage device and uses rules preventing deadlock between storage assignments. The storage event refers to any event that indicates the need for storage assignment of storage devices to items or the need for assignment of items to storage devices.

Once the occurrence of the storage event is detected, the intelligent allocation mechanism obtains input information for the storage devices and the items. In an embodiment, the input information comprises an item metrics set having parameter values for the items and a storage device metrics set having parameter values for the storage devices in the network.

The intelligent allocation mechanism processes the item metrics set and the storage device metrics set based on the type of the storage event to determine a storage assignment. The processing of the item metrics and the storage device metrics may involve determining the suitability of the storage devices for storage of a given item. Conversely the processing of the item metrics and the storage device metrics may involve determining the suitability of the items for storage on a given storage device. The intelligent allocation mechanism thus determines a storage assignment based on item-device suitability. Thereupon, the items are stored on the storage devices in accordance with the storage assignment.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION OF THE PREFERRED EMBODIMENT OF THE INVENTION

The present invention provides a method and system for managing the storage of items across a network of heterogeneous storage devices. The item may be any digital data/information including but not limited to text, images, audio files, video files and others.

Figure 1:
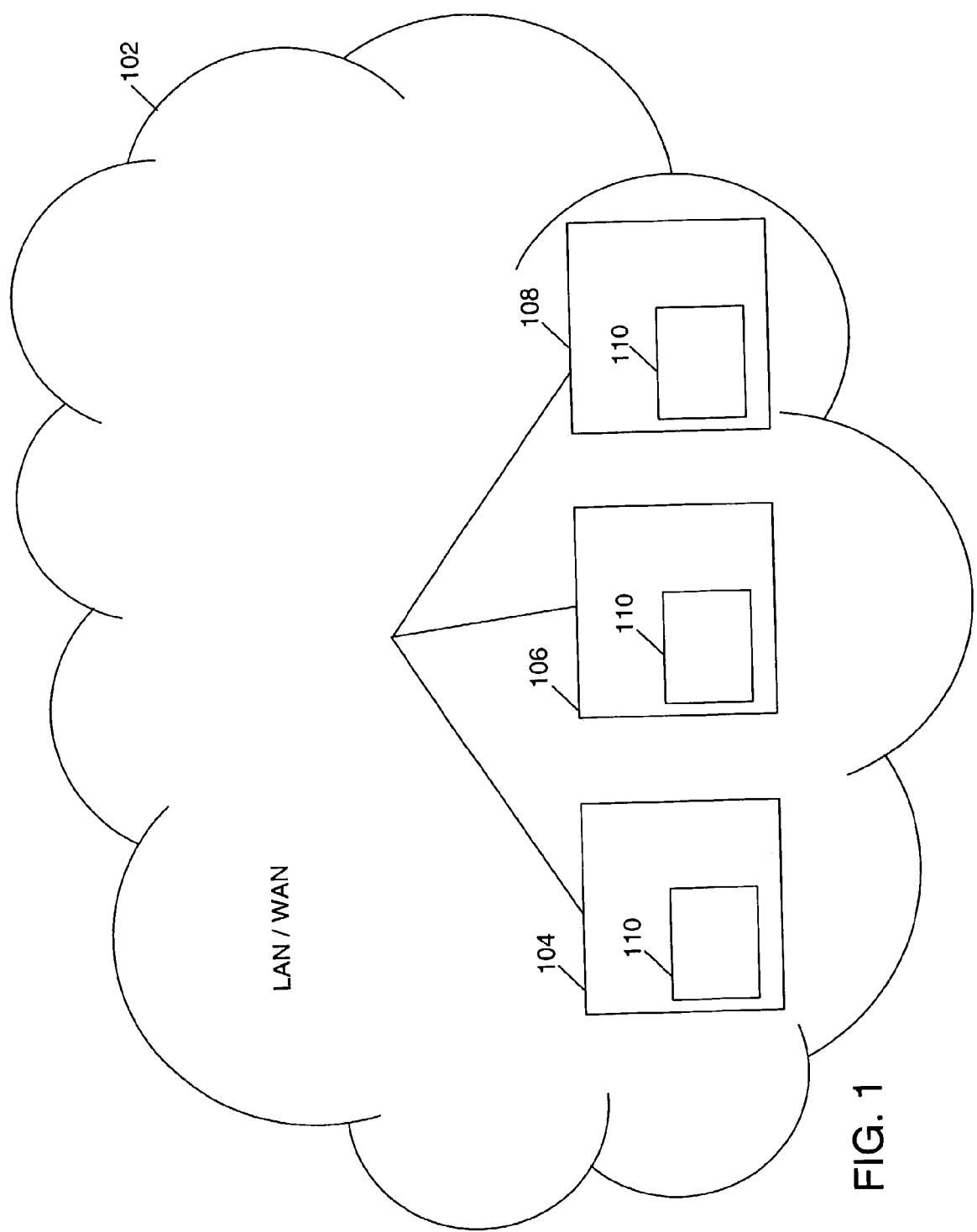
FIG. 1 is a block diagram of a network of heterogeneous storage devices where the present method and system is implemented in accordance with an embodiment of the invention.

Referring to FIG. 1, there is illustrated a block diagram of a network 102 of heterogeneous storage devices where the present method and system is implemented in accordance with an embodiment of the invention. The network 102 may be an enterprise network connecting storage devices such as but not limited to Personal Computers (PCs) and/or workstations that have hard drive storage, Redundant Array of Independent Disks (RAID) and Network Attached Storage (NAS) devices. The network 102 may also be a home network connecting storage devices such as but not limited to PCs, consumer electronics includes Personal Video Recorder (PVR), MP3 players, handheld devices and portable devices. The storage devices may be connected over a Local area Network (LAN), Wide Area Network (WAN) and other types of wired network. Network 102 may also be a wireless network and can employ either client server architectures, or distributed network architectures such as Peer-to-Peer (P2P) architectures. Network 102 may use various protocols such as Transmission Control Protocol/Internet Protocol (TCP/IP), User Datagram Protocol (UDP), Asynchronous Transfer Mode (ATM) or Open Systems Interconnection (OSI) for communication between the storage devices.

Network 102 comprises a first storage device 104, a second storage device 106 and a third storage device 108. First storage device 104, second storage device 106 and third storage device 108 may be physical storage devices or virtual storage devices. A physical storage device refers to a hardware storage device such as but not limited to a hard disk drive. A virtual storage device can be formed by splitting a physical storage device into logical units, or by combining multiple physical storage devices. For example, a hard disk drive may be partitioned into multiple drives to form a virtual storage device. In another example, multiple hard disk drives may be combined to form a virtual storage device such as in the case of RAID.

First storage device 104, second storage device 106 and third storage device 108 are heterogeneous storage devices having different properties and features. Heterogeneity among storage devices arises due to factors such as but not limited to size of the storage device, speed of the storage device and reliability of the storage device. These and other factors of heterogeneity, and the manner in which they are incorporated in the system and method of the present invention have been explained in detail subsequently.

Heterogeneous storage devices (devices 104, 106, 108) receive various storage events that indicate the need for assignment of items to storage devices or the need for assignment of storage devices to items. For example, a storage event that occurs on a storage device may indicate that a user wants to add an item to the storage device. The storage device on which the storage event occurs is referred to as a local storage device. Other storage devices in the network are referred to as remote storage devices for that event. The terms 'local storage device' and 'remote storage device' have been used relative to each other. The classification of storage devices as local storage devices and remote storage devices is dependant upon the storage event and the storage device on which the storage event has occurred. For instance, a storage event A may occur on first storage device 104 and at the same time, a storage event B may occur on second storage device 106. In such a situation, vis-à-vis storage event A, first storage device 104 is a local storage device, while second storage device 106 and third storage device 108 are remote storage devices. Similarly, vis-à-vis storage event B, second storage device 106 is a local storage device, while first storage device 104 and third storage device 108 are remote storage devices. The items that are located on the local storage device are referred to as local items, while the items that are located on the remote storage devices are referred to as remote items.

In this embodiment, an intelligent allocation mechanism 110 is embedded on each storage device in network 102 to decide upon storage of items. This results in a distributed system where each storage device can decide upon storage of items in network 102. For example, a PVR in a home network can decide whether to store a movie on the PVR itself or on a PC, which is connected to the PVR through the home network, or on both the PVR and the PC. Further, each storage device independently decides which item should be stored on which storage device in the network, without consultation with other storage devices. This allows for asynchronous storage assignment by each of the storage devices.

Intelligent allocation mechanism 110 processes input information comprising a set of item metrics and a set of storage device metrics. Intelligent allocation mechanism 110 processes the item metrics and the storage device metrics to determine a storage assignment. The storage assignment is determined based on the suitability of the items and the storage devices with respect to each other. This implies that intelligent allocation mechanism 110 assigns a storage device to an item based on suitability of the storage device for storing the item; for example, an MP3 jukebox is more suitable for storing an audio file than a PC, as the MP3 jukebox inherently has the appropriate mechanism for playing MP3 files. Vice versa, intelligent allocation mechanism 110 assigns an item to a storage device based on the suitability of the item for storage on the storage device. The operation of intelligent allocation mechanism 110 for storage assignment is explained below.

Figure 2:
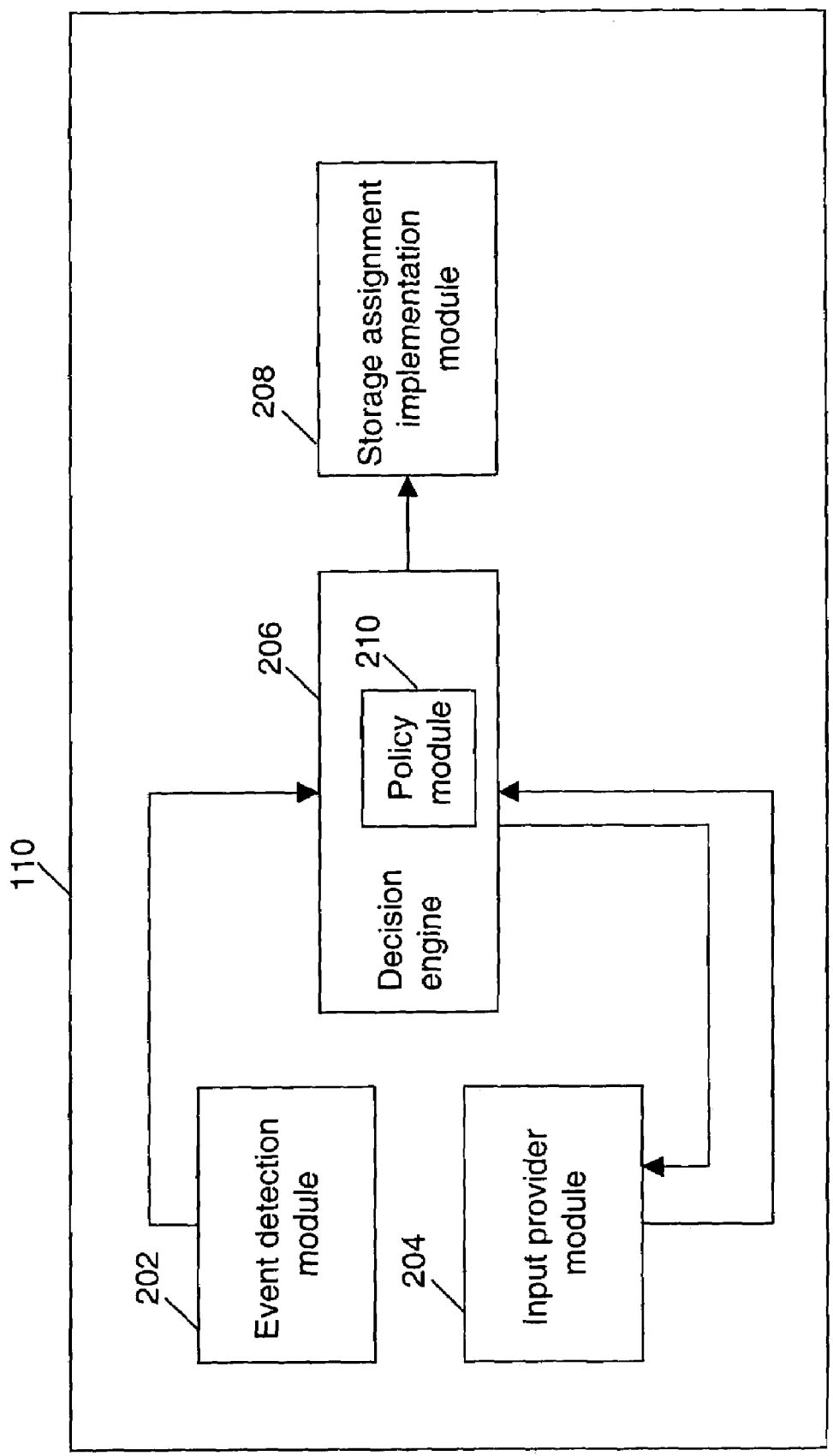
FIG. 2 is a block diagram of an intelligent allocation mechanism in accordance with an embodiment of the present invention.

Referring to FIG. 2, there is illustrated a block diagram of the exemplary elements of intelligent allocation mechanism 110 in accordance with an embodiment of the present invention. The intelligent allocation mechanism 110 comprises an event detection module 202, an input provider module 204, a decision engine 206 and a storage assignment implementation module 208. Event detection module 202 detects the storage event that occurs on the storage device. As described earlier, a storage event refers to any event which requires the assignment of storage devices to items or the assignment of items to storage devices. Exemplary storage events are an item addition event, an item optimization event and a device full event.

Item addition event refers to an event that occurs upon the addition of an item to the storage device. For example, an item addition event may occur upon the addition of a new item to the storage device by a user. New item refers to any item that is introduced to the network for the first time and is distinct from items already existing on the storage devices in the network. Item addition may also refer to an event that occurs when the user moves an item located on a storage device to any other storage device in the network. Item addition event requires the assignment of one or more storage devices to the item that is added, based on the suitability of the storage devices.

Item optimization event refers to an event that facilitates the optimization of the use of storage space on the network. In an exemplary case, the optimized use of storage space on the network may be facilitated by storing those items on each of the storage devices that result in a relative increase in performance of the storage devices. Thus, in accordance with one aspect of this embodiment, upon detection of an item optimization event, intelligent allocation mechanism 110, embedded on the local storage device, determines those remote items that would result in a relative increase in the performance of the local storage device. The local storage device 'pulls' one or more of these remote items from the remote storage devices. Thereupon, these remote items are stored on the local storage device. In an embodiment, the item optimization event periodically occurs on each storage device in the network.

Device full event refers to an event that occurs when there is a need to free storage space on the storage device. For example, a device full event may occur once the storage space on the storage device is full, and consequently the storage device is unable to accept one or more items for storage. In such a case, intelligent allocation mechanism 110 selects one or more local items to be relocated/removed in order to free storage space on the local storage device. In an exemplary case, the local items whose removal would yield the greatest relative increase in performance of the local storage device are selected for relocation.

Device full event can be said to be complementary to the item optimization event as both storage events facilitate a relative increase in the performance of the network. For this increase in performance, remote items are 'pulled' to the local storage device upon occurrence of the item optimization event, while local items are 'pushed' (removed) from the local storage device upon occurrence of the device full event.

The event detection module 202 recognizes the occurrence of a storage event. Event detection module 202 is connected to decision engine 206. In an embodiment, event detection module 202 triggers an interrupt every time a storage event occurs on the local storage device. A flag is set indicating the type of the storage event so that decision engine 206 can recognize which storage event has occurred. Decision engine 206 requests input provider module 204 to provide input information depending on the type of the storage event.

The input provider module 204 gathers input information for all the storage devices in the network. Input provider module 204 also gathers input information for all the items in the network and input information for the new items that are added to the local storage device.

In an embodiment, the input information comprises two sets of metrics: a set of metrics associated with the items (the item metrics set) and another set of metrics associated with the storage devices (the storage device metrics set). A particular item metric has 'parameters' and 'parameter values' for a particular item. For example, 'size of the item', 'age of the item' and 'type of the item' are some of the parameters that can be associated with a given item. Parameter value of the item refers to the value of a parameter associated with the item; for example, parameter value for 'size of the item' may be '100 Megabytes (MB)'.

Storage device metrics also have 'parameters' and 'parameter values' associated with a particular storage device. For example, 'speed of the storage device', 'processor capability' and 'display capability' are some of the parameters that can be associated with the given storage device. Parameter value of the storage device refers to the value of a parameter associated with the storage device; for example, parameter value for 'speed of the storage device' may be '1000 Kilobits per second (Kbps)'.

Input provider module 204 provides appropriate input information to decision engine 206 based on the type of the storage event. For example, in the case of an item addition event, where one or more items are added to the local storage device, decision engine 206 is required to decide upon the optimal storage location for storing the added item(s). The optimal storage location may be the local storage device itself or any remote storage device. Thus, the appropriate input information for the item addition event comprises the item metrics having parameter values for the added item(s) and the storage device metrics having parameter values for all the storage devices in the network (i.e. the local storage device and the remote storage devices). This input information enables decision engine 206 to determine a storage assignment for the added item such that the added item is stored at the optimal location. The appropriate input information for exemplary embodiments of the item addition event, the item optimization event and the device full event has been described below in conjunction with FIG. 5, FIG. 6 and FIG. 7 respectively.

Figure 3:
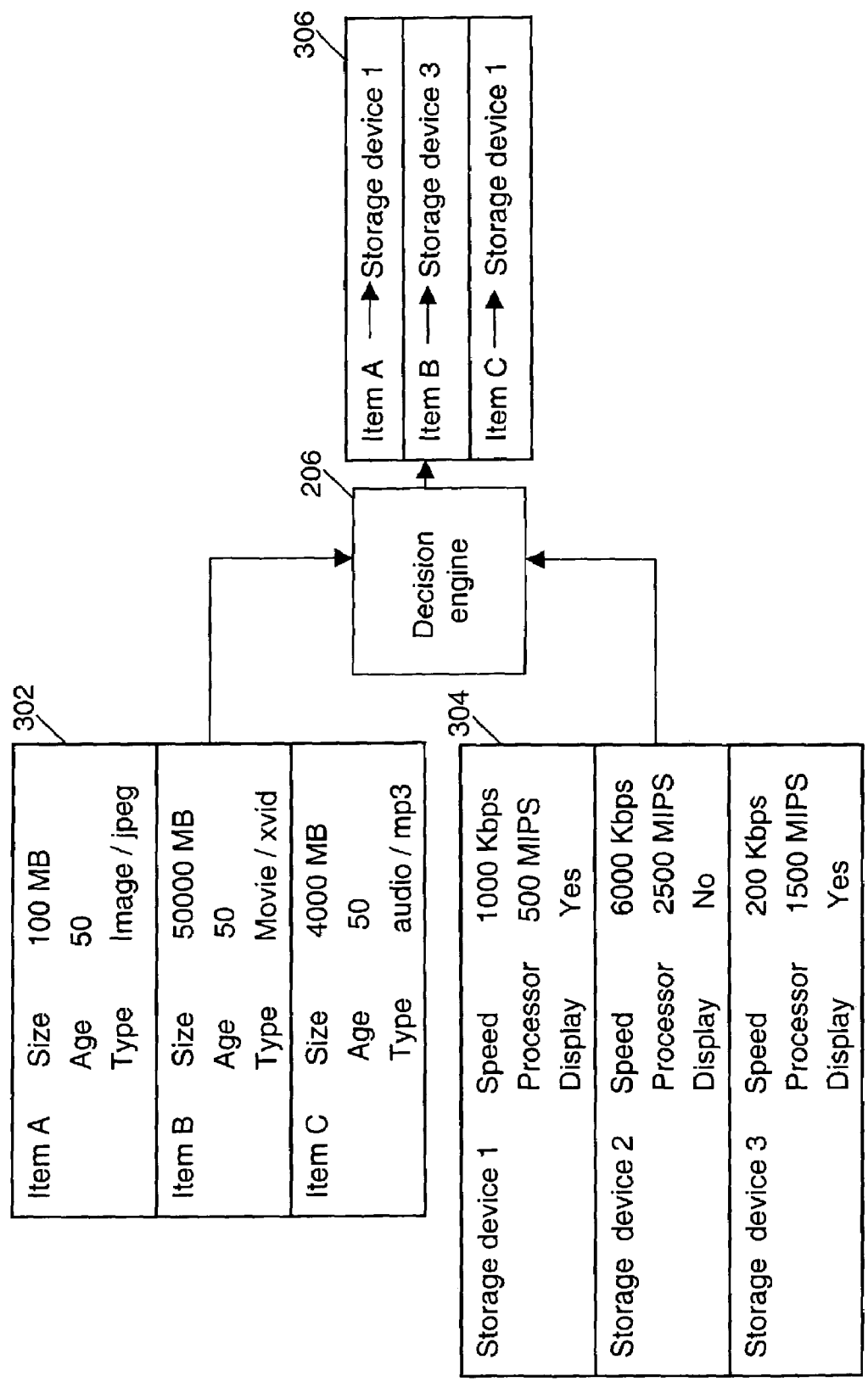
FIG. 3 illustrates exemplary input information and how a storage assignment is determined from the processing of the input information in accordance with an embodiment of the present invention.

The decision engine 206 processes the item metrics set and the storage device metrics set to determine the storage assignment. An exemplary item metrics set and storage device metrics set, and the storage assignment determined from processing of the item metrics set and the storage device metrics set is shown in FIG. 3.

It would be evident to one skilled in the art that decision engine 206 is able to operate even if some metrics are missing. For example, if the value for the parameter 'vacant space on the storage device' is missing, decision engine 206 could either not include this particular storage device metrics for determining storage assignment, or assume an 'average' value.

Decision engine 206 comprises a policy module 210 that comprises rules corresponding to each of the storage events. The rules are applied by decision engine 206 to determine the suitability of the items and the storage devices with respect to each other. Consider the example of an item addition event where a streaming data item is 'added to' or stored on a storage device with a slow speed. In this case, decision engine 206 would identify the 'streaming' property of the item from the associated item metrics and apply rules corresponding to the item addition event for determining a suitable storage device. Thus, storage devices having a high speed would be determined as being suitable for storing the streaming data item. Policy module 210 also comprises rules for prevention of a deadlock between conflicting storage assignments. The deadlock prevention mechanism and its incorporation as rules in the policy module are described in detail subsequently.

A storage assignment implementation module 208 implements the storage assignment determined by decision engine 206. Storage assignment implementation module 208 stores the item(s) on the storage device(s) in accordance with the storage assignment.

FIG. 3 illustrates exemplary input information and how a storage assignment is determined from the processing of the input information in accordance with an embodiment of the present invention.

Referring primarily to FIG. 3, the input information is provided to decision engine 206. The input information comprises an item metrics set 302 and a storage device metrics set 304. Item metrics set 302 comprises an item metrics for an item A, an item metrics for an item B and an item metrics for an item C. Item metrics for item A has 'parameters' and 'parameter values' related to item A, item metrics for item B has 'parameters' and 'parameter values' for item B and item metrics for item C has 'parameters' and 'parameter values' for item C. For example, 'size', 'age' and 'type' are parameters associated with item A, whereas item A has a parameter value for 'size' of '1.00 MB' and so on.

The storage device metrics set 304 comprises storage device metrics for storage device 1, a storage device metrics for storage device 2 and a storage device metrics for storage device 3. Storage device metrics for storage device 1 has 'parameters' and 'parameter values' related to storage device 1, storage device metrics for storage device 2 has 'parameters' and 'parameter values' for storage device 2 and storage device metrics for storage device 3 has 'parameters' and 'parameter values' for storage device 3. For example, 'speed', 'processor' and 'display' are parameters associated with storage device 1, whereas storage device 1 has a parameter value for 'speed' of '1000 Kbps' and so on.

Item metrics set 302 and storage device metrics set 304 are input to decision engine 206. Decision engine 206 processes item. metrics set 302 and storage device metrics set 304 based on the type of the storage event. Decision engine 206 determines a storage assignment 306. Assuming that the storage event is an item addition event and item metrics set 302 incorporates parameters and parameter values for new items A, B and C; storage assignment 306 has storage devices assigned to the items. Storage device 1 is assigned to item A based on suitability of storage device 1 for storing item A. Similarly, storage assignment 306 has storage device 3 assigned to item B based on suitability of storage device 3 for storing item B.

Figure 4:
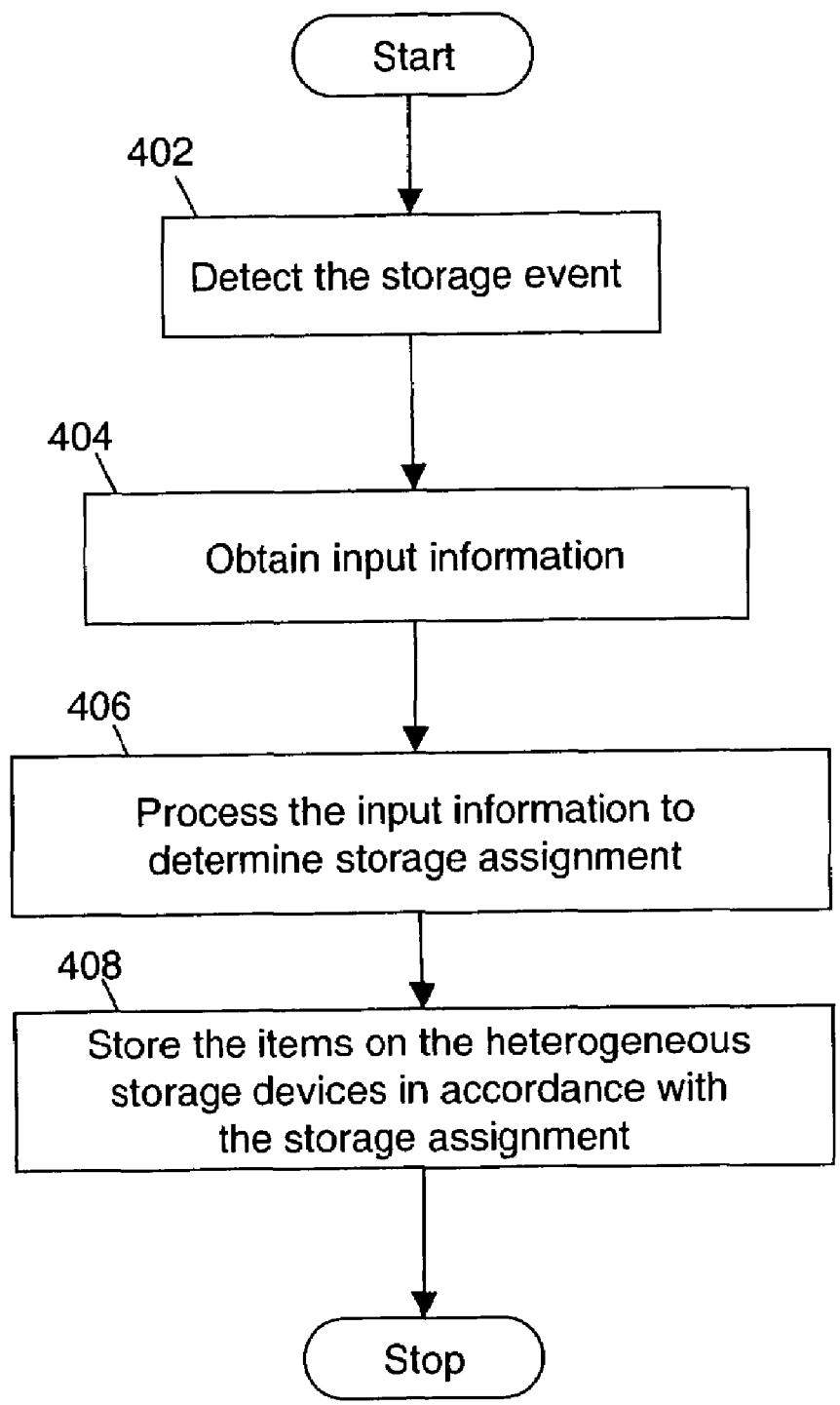
FIG. 4 is a flowchart illustrating the steps comprised in managing storage of at least one item in a network of heterogeneous storage devices in accordance with an embodiment of the present invention.

Referring to FIG. 4, there is a flowchart illustrating the steps involved in managing storage of at least one item in the network 102 of heterogeneous storage devices. At step 402, the occurrence of a storage event is detected at the local storage device. At step 404, input information is obtained. The input information comprises parameter values related to the items and the parameter values related to the heterogeneous storage devices. The parameter values reflect the properties of the storage devices and the items.

At step 406, the input information is processed to determine a storage assignment. The storage assignment is determined with a view to store the items on suitable storage devices. This yields an increase in the performance of the overall network. For example, an item may be stored on a storage device that accesses it most frequently. This avoids the unnecessary traffic involved in retrieving the item whenever the referred storage device requires it. Additionally, from the point of view of the storage device that frequently accesses the item, the latency associated with accessing a locally stored item is lower than that associated with an item that is located remotely. This reduction in latency also contributes to the overall increase in the performance of the network 102.

The storage assignment is determined based on item-device suitability. Item-device suitability measures the suitability of an item for storage on the storage device and, vice-versa, the suitability of the storage device for storing the item. For example, in case of the item addition event, the storage assignment is determined based on the suitability of the storage devices for storing the added item. Conversely, in case of the item optimization event, the storage assignment is based on the suitability of the remote items for storage on the local storage device. Thus, item-device suitability is dependent on the type of the storage event.

The item-device suitability is determined based on rules corresponding to the storage event. The rules that are specified for selection of one or more suitable items are referred to as item selection rules and the rules that are specified for selection of one or more suitable storage devices are referred to as storage device selection rules. The item selection rules and the storage device selection rules can be defined based on the users' requirements. This provides for flexibility as existing rules can be modified and new rules can be added at any stage, according to the user's requirements. The rules may be defined to give prominence to one parameter over the others based on the user's requirements and the storage event.

Figure 5:
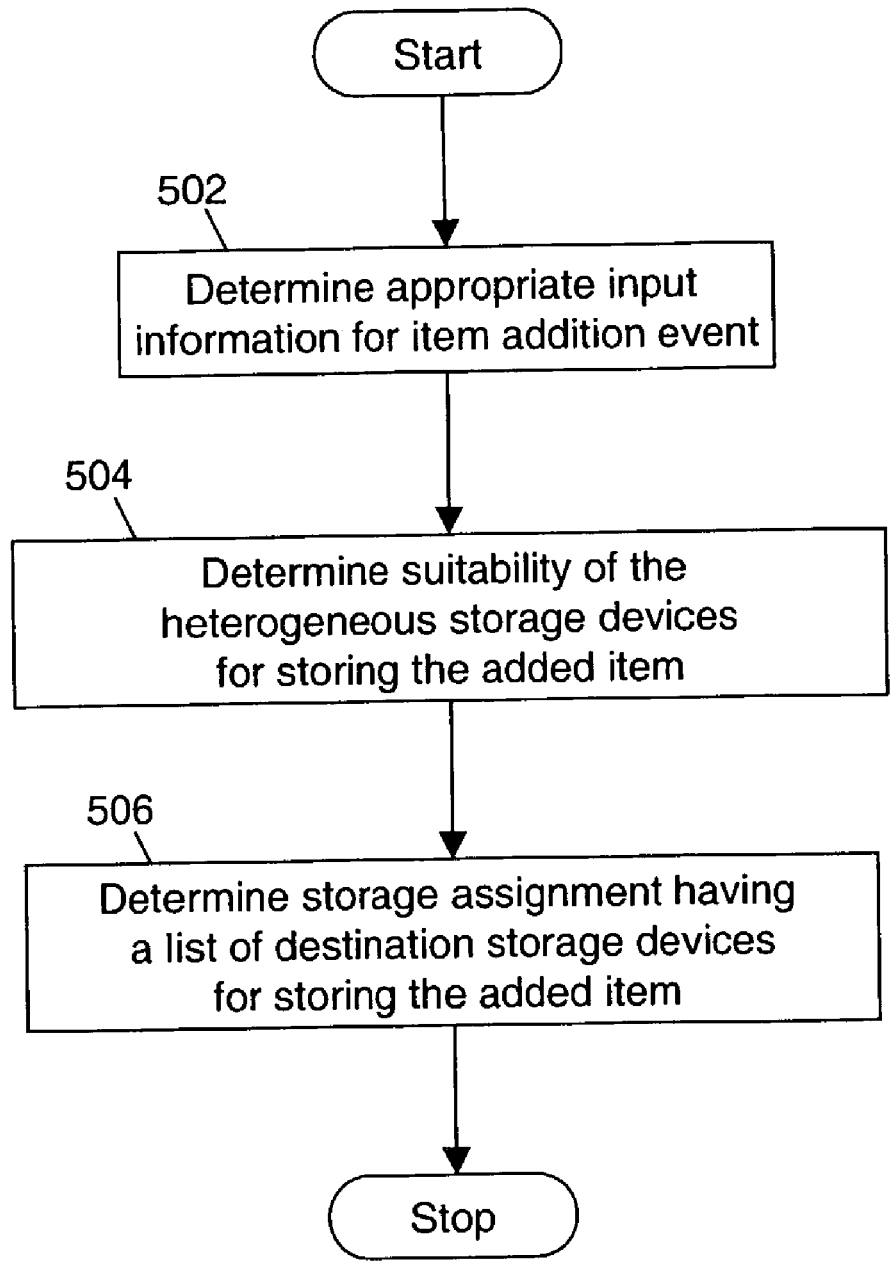
FIG. 5 is a flowchart illustrating the steps comprised in processing of input information in case of an item addition event in accordance with an embodiment of the present invention.

The processing of input information for determining storage assignment in case of the item addition event is described in detail in conjunction with FIG. 5. Further, the processing of input information for determining storage assignment in case of the device full event is described in detail in conjunction with FIG. 6. Finally, the processing of input information for determining storage assignment in case of the item optimization event is described in detail in conjunction with FIG. 7.

At step 408, the item is stored on the storage device(s) according to the determined storage assignment. This involves determining the current location of the item, moving the item from its current location, and storing the item on the storage device(s) according to the storage assignment.

In an embodiment, the location of any item may be resolved at run-time. For example, the location of a remote item may be determined by 'broadcasting' a packet to all storage devices in the network, requesting that any storage device that has the remote item should respond. This is just an exemplary embodiment and various other mechanisms may be employed to identify current location of an item.

In yet another embodiment, the location of any item may be resolved by using a dynamic database table. The dynamic database table is able to dynamically update itself with the changes in storage location of items at run-time. The information relating to storage location of items may be stored in any form in the database table.

An exemplary mechanism by which such a table can be realized is disclosed. Consider the example of the contents of a 'My Pictures' folder in Microsoft Windows®. From the user's point of view, the mapping of item to location is implicit; for example, a picture with the filename 'My Cat.jpg', is, by definition, available from the location, 'C:\Users\My Pictures\My Cat.jpg', because the user is looking at all files in the 'C:\Users\My Pictures' folder. It can be seen that this simple system has used a 'dynamic database table' to map items to locations (i.e. the 'dynamic database table' is implemented by a file-allocation-table (FAT) stored on the computers hard drive).

Another example of a 'dynamic database table' as it relates to item-storage location mappings is Peer-to-Peer (P2P) file sharing. Thus, it is evident that a 'dynamic database table' refers to any entity that allows for identification of a storage location from which an item can be retrieved.

Once the storage location of the item has been identified, the item may be transferred using the Hyper Text Transfer Protocol (HTTP). In other words, items can be read from their current storage location by using an HTTP GET method and then stored on the storage device according to the storage assignment, using an HTTP PUT method.

Other exemplary file transfer protocols that may be employed for actual item transfer include Network Filesystem (NFS), Network Basic Input/Output System (NetBIOS), Distributed Authoring and Versioning (DAV), File Transfer Protocol (FTP) and others. It would be evident to one skilled in the art that any mechanism by which items can be retrieved and stored may be employed. Complex embodiments may incorporate advanced features such as the ability to resume partially transferred items or the ability to transfer only the differences between an old version and a new version of the same item.

Referring to FIG. 5, there is a flowchart illustrating the steps comprised in the processing of input information in case of the item addition event in accordance with an embodiment of the present invention. As stated previously, in one embodiment, the item addition event occurs when the user adds one or more new items to the storage device. One or more destination storage devices for storing an added item are required to be identified upon occurrence of the item addition event. Destination storage device refers to the optimal location or locations for storing the added item. Alternatively, an item addition event may be specified to take place when the user moves an item stored on one storage device to some other storage device in the network. In case of such an item addition event, intelligent allocation mechanism 110 embedded on the latter storage device may again move back the item to the original storage device, or to yet another storage device. However this is not desirable, as the user may have purposely moved the item to the latter storage device. In such a case, it is vital that intelligent allocation mechanism 110 is provided with some input that indicates the level of item persistence with which the user wants the item to remain on the storage device to which the item has been moved. Suitable metrics may be provided to intelligent allocation mechanism 110 where the metrics indicate the level of item persistence desired by the user. Intelligent allocation mechanism 110 thus takes into consideration the level of item persistence desired by the user while deciding upon the storage device suitable for storing the item. The higher this level of item persistence, the higher would be the likelihood of the local storage device being found to be the most suitable device.

In case event detection module 202 detects the item addition event, at step 502, appropriate input information for the item addition event is determined. The appropriate input information for the item addition event refers to the input information that is relevant for determining the storage devices that are suitable for storing the added item. Thus, the appropriate input information for the item addition event comprises the item metrics corresponding to the added item and the storage device metrics corresponding to all the storage devices in the network i.e. the local storage device and the remote storage devices.

At step 504, the suitability of each of the storage devices in the network is determined for storage of the added item. Rules corresponding to the item addition event are applied on the input information to determine the suitability of the storage devices for storing the added item.

Exemplary rules corresponding to the item addition event are now described. In the item addition event, it is implicit that the input information corresponding to the added item(s) shall be considered by decision engine 206. In such a case, a simple item selection rule; 'item=added_item' may be specified.

Regarding storage device selection rules corresponding to the item addition event, a user may require that item addition should take place as quickly as possible. In such a case, the storage device selection rule corresponding to the item addition event may be defined to consider the parameter 'device speed'. Thus, the following simple storage device selection rule could be defined:

SELECT dst_device

ORDER BY device-speed DESC

In another case, an advanced storage device selection rule could be specified to embrace the concept that different storage devices are suited for different media types. The following exemplary rule that extends the above specified storage device selection rule might be defined:

SELECT dst_device
ORDER BY (device_speed*device_media_suitability) DESC

The above rule implies that destination storage devices should be selected in the order of the storage device having a high speed and high suitability for the given type of media. As a result of the application of the above rule, for example, a high-speed PVR may be selected as the destination device for storing movies.

At step 506, the storage assignment is determined where the destination storage devices are listed in the order of their suitability for storing the added item(s). The storage assignment is thus determined, wherein the storage assignment has the list of destination storage devices for storing the added item(s).

Once the storage assignment has been determined, an attempt is made to store the added item(s) on the destination storage device(s) in the sequence in which the destination storage devices appear in the storage assignment. If the added item cannot be stored on the destination storage device appearing first in the list, the destination storage device appearing next in the list is selected. Thus, an attempt is made to store the added item on the destination storage devices until the added item is eventually stored.

Figure 6:
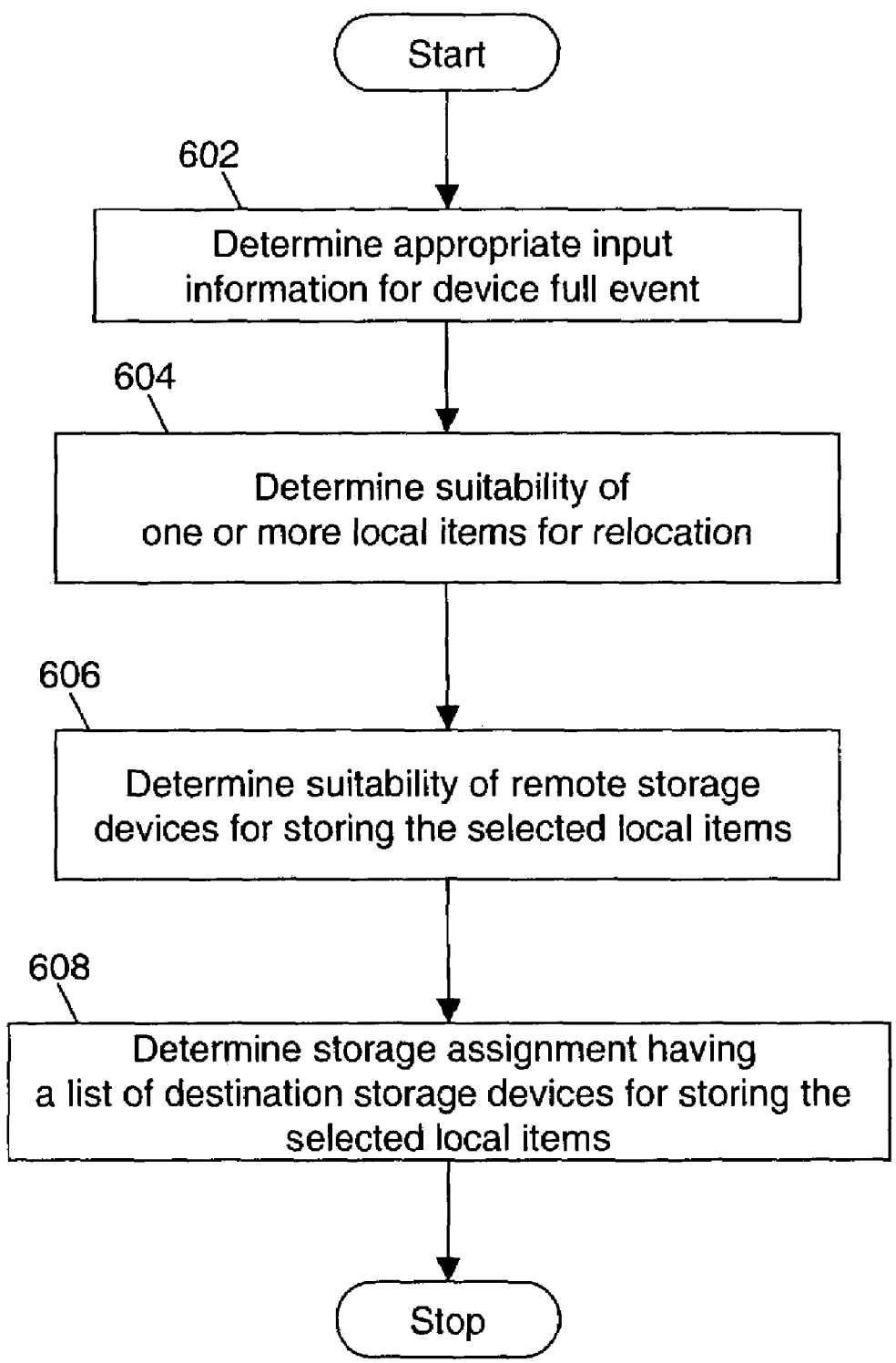
FIG. 6 is a flowchart illustrating the steps comprised in processing of input information in case of a device full event in accordance with an embodiment of the present invention.

Referring to FIG. 6, there is a flowchart illustrating the steps comprised in the processing of the input information in case of the device full event in accordance with an embodiment of the present invention. As stated previously, a device full event occurs once there is a need for more free storage space on a storage device. Thus, a device full event may occur when the storage device is unable to accept one or more items for storage, due to non-availability of free storage space on the storage device. Upon occurrence of the device full event, one or more local items may be relocated in order to free storage space on the local storage device. The local items that are selected for relocation are the ones, whose removal would yield the greatest relative increase in performance of the local storage device.

In case event detection module 202 detects the device full event, at step 602, appropriate input information for the device full event is determined. The appropriate input information for the device full event refers to the input information that is relevant for determining which local items may be relocated. The appropriate input information for the device full event also refers to the input information that is relevant for determining which remote storage devices are suitable for storing the local items that are selected for relocation. Thus, the appropriate input information for the device full event comprises the item metrics corresponding to the local items and the storage device metrics corresponding to the remote storage devices.

At step 604, the suitability of one or more local items for relocation is determined. Rules corresponding to the device full event are applied on the input information to determine the suitability of the local items for removal from the local storage device.

Exemplary rules corresponding to the device full event are now described. A simple item selection rule corresponding to the device full event may be specified that selects the largest local item for relocation. Thus, a simple item selection rule may be:
SELECT item
WHERE item_size=MAX(item-size)
AND device=local_device A complex item selection rule may incorporate the concept of a 'worth-per-unit-storage' value. The 'worth-per-unit-storage' indicates the suitability of the local item for per unit of memory of the storage device. For example, a rule could be specified which evaluates a local item based on the number of times the local item is accessed. This would enable the local storage device to retain items that, despite being very large in size, are frequently accessed. Thus, the following item selection rule may be specified:

$$\rho = N_L/(N_T \times S)$$

where $\rho$ is the worth-per-unit-storage value;

$N_L$ is the number of accesses by the local storage device;

$N_T$ is the total number of accesses by the local storage device and the remote storage devices; and S is the size of the item.

Given that the local item of least worth is to be selected for relocation, the rule would be:
SELECT item
WHERE $\rho$=MIN ($\rho$) AND device=local_device This rule implies that the local item having the minimum number of accesses on the local storage device would be selected for relocation.

Once the local item has been selected for relocation, at step 606, the suitability of the remote storage devices for storing the selected local item is determined. The suitable remote storage devices are referred to as destination storage devices. Regarding storage device selection rules corresponding to the device full event, the following simple storage device selection rule may be specified to select the destination storage devices that have the most vacant storage space:
SELECT dst_device
ORDER BY free_space DESC At step 608, a storage assignment is determined wherein the destination storage devices are listed in the order of their suitability for storing the local item(s). The storage assignment is thus determined, wherein the storage assignment has the list of destination storage devices for storing the local item(s) selected for relocation.

Once the storage assignment has been determined, an attempt is made to store the local item(s) on the destination storage device(s) in the sequence in which the destination storage devices appear in the storage assignment. If the local item cannot be stored on the destination storage device first appearing in the list, the destination storage device appearing next in the list is identified. Thus, the attempt is made to store the local items on the destination storage devices until the local item is eventually stored on the remote storage device(s).

In an alternative device full event processing rule, the local items identified at step 604 may be relocated to an archival storage device. Consequently, at step 606 an advanced device selection rule may be applied for selecting remote storage devices that are purpose built for archiving.

In yet another alternative, the concept of automated deletion of items may be incorporated. For example, if at step 604 it is determined that an item, such as a temporary file, has a worth-per-unit-storage value below a predefined threshold, then this item may be selected for deletion rather than relocation to a remote storage device. In such a case, the temporary file may be moved to a virtual storage device; the virtual storage device flagged as a 'deleted items bin' ('Recycle bin' in Microsoft Windows® environment). The 'deleted items bin' stores the deleted items, pending permanent deletion by the user. Thereupon, the user can permanently delete these items from the virtual storage device. In another approach, the item may be permanently deleted immediately rather than requiring explicit user authorization. Hence both 'permanent deletion' and 'pending deletion' are possible.

Figure 7:
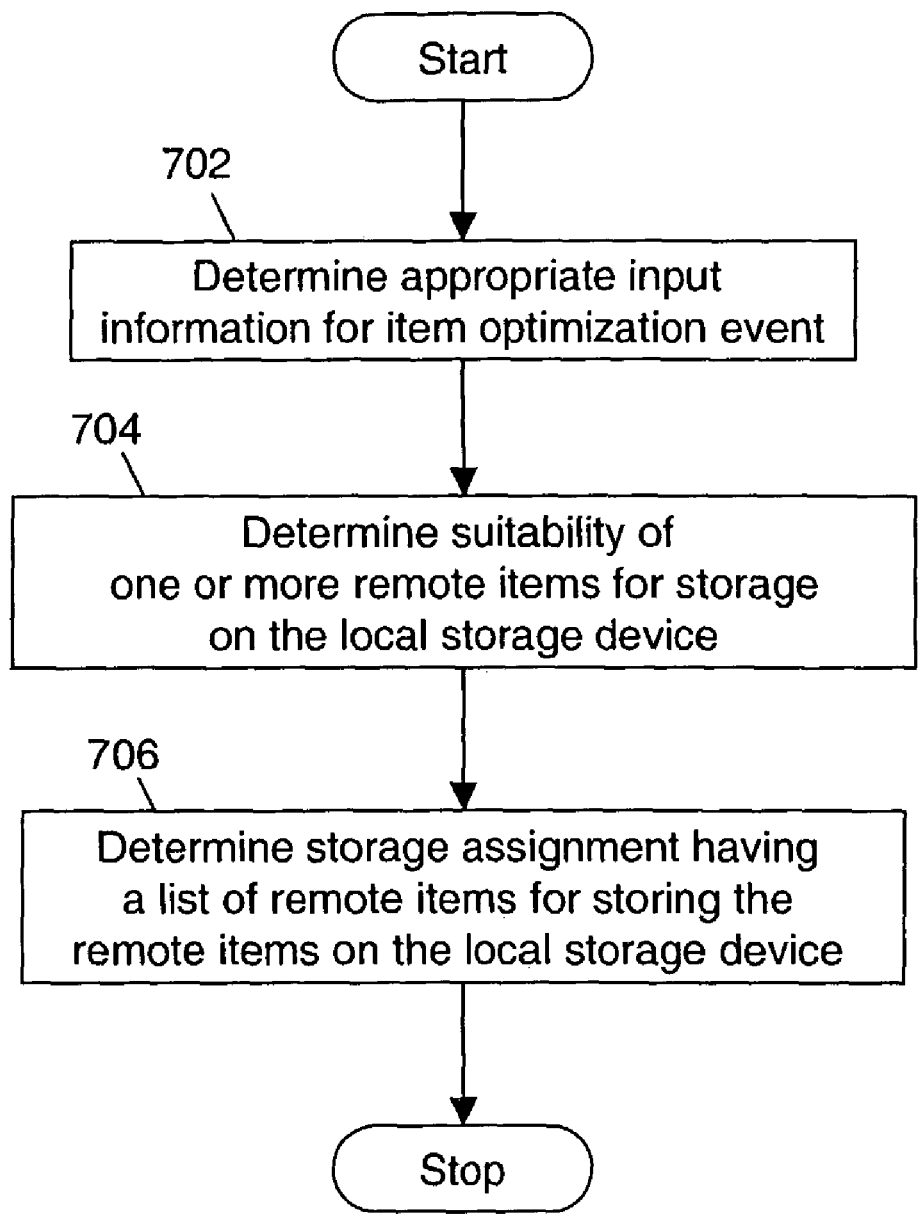
FIG. 7 is a flowchart illustrating the steps comprised in processing of input information in case of an item optimization event in accordance with an embodiment of the present invention.

Referring to FIG. 7, there is a flowchart illustrating the steps comprised in the processing of the input information in case of the item optimization event in accordance with an embodiment of the present invention. The item optimization event facilitates the optimization of the use of the storage space on the network. The optimization of the usage of storage space may be achieved by relocating items to storage devices that would result in a relative increase in the performance of the network. Thus, upon occurrence of the item optimization event, remote items that would result in a relative increase in the performance of the local storage device are pulled to the local storage device. In an embodiment, the item optimization event is configured to occur at specified time intervals.

In case event detection module detects the item optimization event, at step 702, appropriate input information for the item optimization event is determined. Appropriate input information for the item optimization event refers to the input information that is relevant for determining which remote items are suitable for storage on the local storage device. Thus, the appropriate input information for the item optimization event comprises the item metrics corresponding to the remote items and the storage device metrics corresponding to the local storage device.

At step 704, the suitability of one or more remote items for storage on the local storage device is determined. Rules corresponding to the item optimization event are applied on the appropriate information to determine the suitability of the remote items for storage on the local storage device.

For item optimization, an exemplary item selection rule may be specified that is complementary to the item selection rule specified for the device full event. In such a case, the following rule may be specified for selecting remote items for storage on the local storage device:

SELECT item
WHERE $\rho$=MAX ($\rho$) AND device !=local_device

The above rule implies that a remote item having the maximum number of accesses by the local storage device would be selected for storage on the local storage device.

Regarding storage device selection rules corresponding to the item optimization event, the item optimization event implicitly assumes that the storage device is the local storage device. Thus the following simple exemplary storage device selection rule may be specified:

SELECT device
WHERE device=local_device

At step 706, a storage assignment is determined wherein the remote items selected at step 704 are listed in the order of their suitability for storage on the local storage device. The storage assignment is thus determined, wherein the storage assignment is the list of remote items intended for storage on the local storage device.

Once the storage assignment has been determined an attempt is made to store the remote item(s) on the local storage device in the sequence in which the remote items appear in the storage assignment. If the remote item first appearing in the storage assignment cannot be stored on the local storage device, the remote item appearing next is identified. Thus, the attempt is made to store the remote item(s) on the local storage device until all items in the list have been considered.

Besides the storage events described above, various other storage events may be incorporated to invoke storage assignment by the intelligent allocation mechanism 110. For example, a backup storage event may be incorporated for storing multiple copies of items, such as but not limited to critical items and frequently accessed items. Usually, the copies of the items are stored on storage devices other than the one(s) on which the items are originally located. This allows for a provision against the risk of losing the items in case of a failure of the original storage device. Upon occurrence of the backup storage event, intelligent allocation mechanism 110 on the local storage device identifies items for which backup is required. Further, one or more storage devices suitable for providing a backup of the identified items are determined, where the backup storage event can be configured to occur periodically.

An archiving storage event may also be incorporated. Upon detection of the archiving event, those items that are not frequently accessed may be identified for archiving by applying appropriate item selection rules. Storage device selection rules may be specified that select storage devices suitable for archiving. Thus identified items are stored on storage devices purpose built for archival storage.

The present invention also incorporates a mechanism for modification of items. A simple embodiment of the present invention can support modifications via the deletion of the original item followed by the addition of the modified item. In a complex embodiment, the transfer mechanism (i.e. the HTTP GET/PUT, stated earlier) may be capable of transferring only the difference between the original item and the modified item (for example, via a Difference/Merge (DIFF/MERGE) type copy operation). Further, the overall system may support versioning such that a rollback to a previous version of an item is possible.

It would be evident from the foregoing description that heterogeneity among storage devices is accounted for during storage assignment. This is evident as any property that can be associated with any storage device or item can be incorporated in the form of rules for item selection and storage device selection. For example, a factor 'size of storage space' may be incorporated in the rules for storage assignment. Further, 'total size of the storage device' and 'vacant storage' may be treated differently.

Another factor, namely, need for decentralization of data may also be incorporated in the rules. In this case, if a 1 Terabyte (TB) storage device has only 100 MB vacant storage space, then it may be less suitable than a 1 Gigabyte (GB) storage device that also has 100 MB vacant storage space. In this manner decentralization of data in the network can be attained, thereby reducing the reliance of a user on a single storage device.

Another factor, 'speed of a storage device', could be used to determine the suitability of the storage device for storing temporary or streaming data files, such as a scratch file for an image-editing program or a video file. Latency of a storage device, which implies delay or waiting time involved in the actual storage or retrieval of an item, may thereby be incorporated into the rules for storing random access files.

Yet another factor that may be incorporated into storage device selection rules may be the 'delivery mechanism' of the storage device. Consider the example of a digital PVR; this storage device would be suitable for movies as opposed to data files since it has value-added features with regard to the former.

Reliability is another factor, which may be present in some storage devices and absent in others. For example, a storage device for which risk of failure is minimal is more suited for storing mission-critical items. Conversely, if the storage device is portable, then it can be used for storing non-critical items or copies of items originally located on other storage devices. These and other factors that result in heterogeneity across storage devices may be incorporated to define rules for storage assignment.

The process for determining storage assignment has been described as incorporating quantitative criteria, where suitability of the items/storage devices is determined based on the quantitative value of the parameters; for example, 'speed' expressed as a quantitative value (i.e. 1000 Kbps). In another embodiment, the process of determining suitability may incorporate relative criteria; for example, a fuzzy logic system may enable decision engine 206 to deal with 'parameter values' such as 'slow' or 'fast' rather than quantitative values. Further, another embodiment of decision engine 206 may incorporate a machine learning mechanism, such as but not limited to a neural network that makes 'black-box' type decisions based on a set of input metrics. These are exemplary embodiments for determining suitability of items/storage devices. It would be evident to one skilled in the art that various other mechanisms may be incorporated for determining suitability of items/storage devices, depending upon the type of the input information.

According to the present invention, the storage events described hereinbefore may be configured to occur in various scenarios. For example, the deletion of an item by a user may result in triggering of the item optimization event. Once an item is deleted, some storage space on the storage device is emptied. The item optimization event can be configured to trigger in such a scenario so that the storage device can 'pull' a suitable remote item that will optimize the use of the storage space that was just made available.

Consider another example of the device full event. The device full event has been described above with reference to the scenario where a storage device is unable to accept one or more items for storage, due to non-availability of vacant storage space on the storage device. In other words, the device full event occurs reactively. In another scenario, the device full event may be configured to occur proactively, i.e. the device full event may be triggered even when there is some vacant storage space still available on the storage device. For instance, every time a storage device has an item added to it, either via a 'push' (resulting from device full event on another storage device) or 'pull' (resulting from item optimization event on the storage device itself), the device full event may be triggered on the storage device, to remove worthless items from the storage device. Accordingly, a high-speed storage device that is being used for storing 'scratch' or 'temporary random access files', may remove such items. Thus, it is evident that the storage events may be defined to occur in different scenarios, and some scenarios may result in the occurrence of a combination of storage events.

The present invention also incorporates a deadlock prevention mechanism. As described, there are several decision engines running in parallel on independent storage devices according to an embodiment of the present invention. These decision engines may determine conflicting storage assignments that can result in a deadlock. For example, consider a situation where two or more storage devices identify different locations as being suitable for storing a given item. Without a mechanism for deadlock prevention, this item may be continuously shuffled between the identified storage devices. A deadlock can be prevented if intelligent allocation mechanism 110 on each of the storage devices is not allowed to select the same item over and over again.

An exemplary mechanism for deadlock prevention, which is comprised of deadlock prevention rules, is described in policy module 210. The simplest mechanism by which deadlock can be avoided is by adapting the rules in policy module 210. The rules can be adapted such that each time an item is moved, the item is biased such that it is less likely to be selected again for relocation. For example, consider the item selection rules for the device full event where the value of $\rho$ is computed dependent on the number of accesses. To prevent deadlock, the value of $\rho$ may be adapted by dividing '$\rho$' by the number of times the given item has been moved. Therefore, if some storage device decides that some item needs to be relocated, and then, later, some other storage device decides that the same item should be moved back, the latter device would be forced to adjust the item's worth-per-unit-storage value, thereby reducing the item's suitability for relocation.

While this simple deadlock prevention could still result in an item shuffling continuously between storage devices, the iterative reduction in value of '$\rho$' prevents one item from being selected to the exclusion of all others.

It would be evident to one skilled in the art that any advanced deadlock prevention mechanism may be employed; for example, one may consider weighting the number of times an item has been moved with the time when the last movement was effected.

The present invention has so far been described in accordance with a distributed and asynchronous embodiment. According to another embodiment of the present invention, intelligent allocation mechanism 110 may be embedded on a central storage device. This storage device can determine, and thereupon issue storage assignment instructions to heterogeneous storage devices, and move/relocate items for storage among them.

Exemplary mechanisms for obtaining the item metrics and the device metrics are now described. The item metrics may be obtained simply by reading a file system. This is similar to the following example; if one does a directory listing of the "My Pictures" folder via Microsoft® Windows®, the 'item ID' (the filename), the 'item type' (via the extension), the 'item size', 'last date accessed', 'last date modified', and 'last user accessed' can be obtained.

Additionally, extra information can be obtained by reading the metadata attached to an item; for example, ID3 tags that provide an MP3 music file with information regarding the artist and the genre of the song in question. Similar embedded metadata exists for JPG photographs (via Exchangeable Image File Format (EXIF) meta data) and many other file formats.

Regarding the mechanism for obtaining the storage device metrics, one mechanism involves 'advertising' of the storage device features by the storage device itself. Example protocols that may be used for this purpose include 'service discovery' protocols such as but not limited to Service Location Protocol (SLP), Managed Data Network Service (MDNS), Universal Plug and Play (UPnP) and Session Description Protocol (SDP). All these protocols allow one storage device to communicate its metrics to other storage devices in the network. Another mechanism through which storage device metrics can be obtained involves combining information from existing sources as exemplified as follows:

'Vacant storage space' and 'Total storage space' can be obtained by using the same mechanism that Microsoft® Windows® Explorer® employs while browsing a network;

'Storage device speed' and 'storage device latency' can be obtained by transferring an item of known size and by making the distributed system record the results;

'Device Reliability' can be measured simply by observing how long the storage device is continuously connected to the network.

It would be evident to one skilled in the art that the system of the present invention can be configured to support multiple input sources. Each source of metrics can be 'read' into the system by using an appropriate translator; for example, like the translator used by Microsoft® Word® when importing different document formats.

Embodiments of the present invention may be incorporated into existing operating systems. Similar to the case of a virus-scanner, this embodiment enables the delivery of value-added features (i.e. distributed item storage) while allowing the use of existing client software (i.e. the system would be backwards compatible).

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of managing storage of at least one item in a network of heterogeneous storage devices, the heterogeneous storage devices comprising a local storage device and one or more remote storage devices, the method comprising:
    detecting a storage event, the detection being effected by the local storage device;
    obtaining input information, the input information having parameter values related to the item and the heterogeneous storage devices;
    processing the input information to determine a storage assignment, the storage assignment being determined for storage of the item on one or more of the heterogeneous storage devices based on item-device suitability determined from a combination of at least one item selection rule and at least one storage selection rule and avoiding a deadlock between storage assignments, the storage assignments being determined by two or more local storage devices in the network.

2. The method as recited in claim 1 wherein processing the input information if the event is an item addition event comprises:
    determining suitability of the heterogeneous storage devices in the network for storing an added item, the added item being the item that is added to the local storage device; and
    determining the storage assignment, the storage assignment comprising a list of destination storage devices, the destination storage devices being optinial locations for storing the added item.

3. The method as recited in claim 1 wherein processing the input information if the event is an item optimization event comprises:
    determining suitability of one or more remote items for storing the remote items on the local storage device, wherein the remote items are items located on the remote storage devices; and
    determining the storage assignment, the storage assignment comprising a list of remote items for storing the remote items on the local storage device.

4. The method as recited in claim 1 wherein processing the input information if the event is a device full event comprises:
    determining suitability of one or more local items for relocating the local items, wherein the local items are the items located on the local storage device;
    selecting a list of local items that are to be relocated;
    determining suitability of the remote storage devices for storing the selected local items; and
    determining storage assignment, the storage assignment comprising a list of destination storage devices, the destination storage devices being the remote storage devices that are suitable for storing the selected local items.

5. The method as recited in claim 1 wherein the method further comprises storing the item on the heterogeneous storage devices in accordance with the storage assignment.

6. A system for managing storage of at least one item in a network of heterogeneous storage devices, the system comprising:
    an event detection module, the event detection module detecting storage events on the heterogeneous storage devices;
    an input provider module, the input provider module providing item metrics and storage device metrics;
    a plurality of decision engines; each decision engine being connected to the input provider module and the event detection module; each decision engine determining storage assignment, the storage assignment assigning the item to one or more of the heterogeneous storage devices based on item-device suitability, wherein; each decision engine includes a policy module with at least one item selection rule, at least one storage selection rule, and rules for preventing a deadlock between storage assignments; and
    a storage assignment implementation module connected to; each decision engine, the storage assignment implementation module storing the item on one or more of the heterogeneous storage devices in accordance with the storage assignment.

7. The system as recited in claim 6 wherein the input provider module is centrally implemented in the network of heterogeneous storage devices.

8. The system as recited in claim 6 wherein the input provider module is implemented on each storage device in the network.

9. The system as recited in claim 6 wherein one of the plurality of decision engines is centrally implemented in the network of heterogeneous storage devices.

10. The system as recited in claim 6 wherein the plurality of decision engines includes a separate decision engine implemented on each storage device in the network.

* * * * *